(12) United States Patent
Beaufils et al.

(10) Patent No.: US 10,044,777 B2
(45) Date of Patent: Aug. 7, 2018

(54) METHOD AND DEVICE FOR COMMUNICATING BETWEEN AT LEAST A FIRST TERMINAL AND A SECOND TERMINAL

(71) Applicant: ORANGE, Paris (FR)

(72) Inventors: Eric Jacques Beaufils, Langoat (FR); Hugues Nicolas Lecarpentier, Louannec (FR)

(73) Assignee: Orange, Paris (FR)

( * ) Notice: Subject to any disclaimer, the term of this patent is extended or adjusted under 35 U.S.C. 154(b) by 227 days.

(21) Appl. No.: 14/916,977

(22) PCT Filed: Sep. 25, 2014

(86) PCT No.: PCT/FR2014/052402
§ 371 (c)(1),
(2) Date: Mar. 4, 2016

(87) PCT Pub. No.: WO2015/044594
PCT Pub. Date: Apr. 2, 2015

(65) Prior Publication Data
US 2016/0226933 A1    Aug. 4, 2016

(30) Foreign Application Priority Data

Sep. 27, 2013    (FR) ..................................... 13 59360

(51) Int. Cl.
*G06F 15/16*    (2006.01)
*H04L 29/06*    (2006.01)
(Continued)

(52) U.S. Cl.
CPC .......... *H04L 65/403* (2013.01); *G06T 11/203* (2013.01); *G06T 11/60* (2013.01);
(Continued)

(58) Field of Classification Search
CPC ...... G06F 3/0416; G06T 11/203; G06T 11/60; H04L 51/04; H04L 65/1069;
(Continued)

(56) References Cited

U.S. PATENT DOCUMENTS 6,501,463 B1 * 12/2002 Dahley .................. G01L 1/205
345/156
6,680,940 B1    1/2004 Lewin et al.
(Continued)

FOREIGN PATENT DOCUMENTS

WO           02/07396 A1      1/2002
WO       WO 02/07396      *  1/2002

OTHER PUBLICATIONS

The International Search Report for the PCT/FR2014/052402 application.

*Primary Examiner* — David Lazaro
(74) *Attorney, Agent, or Firm* — Haverstock & Owens LLP

(57) ABSTRACT

The invention concerns a method and a device for communicating between at least a first terminal (15) and a second terminal (12), a first communication session (S1) having previously been established by the first terminal, and first drawing data intended to be transmitted to the second terminal having been generated (E206) by at least the first terminal. When the second terminal is not available to participate in the first communication session, the communication method stores (E209) said first drawing data in a communication device. After the end of said first communication session, the communication device sends (E215) an invitation message to the second terminal inviting it to participate in a second communication session (S2) and transmits (E219) said first drawing data to the second terminal during the second communication session.

15 Claims, 3 Drawing Sheets

Figure 1:
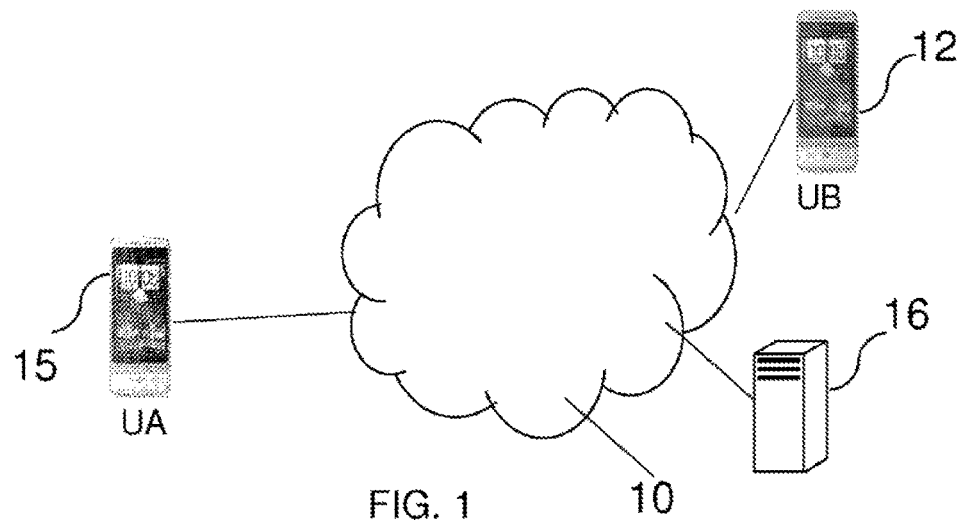

(51) Int. Cl.
*H04L 29/08* (2006.01)
*G06T 11/20* (2006.01)
*G06T 11/60* (2006.01)

(52) U.S. Cl.
CPC .......... *H04L 65/1069* (2013.01); *H04L 67/06* (2013.01); *H04L 67/2842* (2013.01)

(58) Field of Classification Search
CPC ....... H04L 65/403; H04L 67/06; H04L 67/24; H04L 67/2842; H04L 67/38
See application file for complete search history.

(56) References Cited

U.S. PATENT DOCUMENTS

| | | | |
|---|---|---|---|
| 9,380,264 B1* | 6/2016 | Vakalapudi | H04N 7/147 |
| 2006/0148527 A1* | 7/2006 | Blount | G06F 3/0416 |
| | | | 455/566 |
| 2006/0294112 A1* | 12/2006 | Mandato | H04L 29/06027 |
| 2007/0211138 A1* | 9/2007 | Graham | H04N 7/148 |
| | | | 348/14.01 |
| 2009/0197622 A1 | 8/2009 | Atarius | |
| 2013/0262365 A1* | 10/2013 | Dolbear | G06N 5/02 |
| | | | 706/47 |
| 2014/0351832 A1* | 11/2014 | Cho | H04L 67/141 |
| | | | 719/328 |
| 2016/0226933 A1* | 8/2016 | Beaufils | H04L 67/06 |

\* cited by examiner

METHOD AND DEVICE FOR COMMUNICATING BETWEEN AT LEAST A FIRST TERMINAL AND A SECOND TERMINAL

The invention relates to the field of telecommunications networks. It concerns a device and a method for communicating between at least a first terminal and a second terminal.

At the present time, it is possible for users to establish a shared drawing communication session from their terminals.

The document US 20060148527 describes a system enabling users belonging to a user group and each having a terminal to draw jointly, remotely and in real time, during a communication session established by means of a server of a communications network. Each terminal of the user group indicates its presence to the server, which then sends a signal denoting the presence of the terminal to the other terminals in the group. If a terminal sends a signal indicating its desire to participate in a drawing communication session, the server initiates a drawing communication session among the terminals that have signaled their presence to the server. During the communication session, each terminal participating in the communication session generates drawing data, following an interaction of a user of the user group with a graphical interface of the terminal. The generated drawing data are sent to the server, which then transmits them to the other terminals participating in the communication session. During the communication session, the server stores the drawing data sent by each terminal and transmits the drawing data to the other terminals participating in the communication session.

During the communication session, a terminal joining the communication session in progress can obtain, by sending a request to the server, the history of the drawing data sent by the other terminals during the communication session.

In the prior art, a terminal that was not present during the communication session is not informed that a communication session has taken place among the terminals of the group.

Additionally, once the communication session has been terminated, a terminal cannot resume the communication session to interact with the drawing data sent during the preceding communication session.

One of the objects of the invention is to make improvements to the prior art.

To this end, it proposes a method for communicating between at least a first terminal and a second terminal, a first communication session having previously been established on the initiative of the first terminal by the first terminal's sending of an invitation message to the second terminal to participate in said first communication session, first drawing data having been generated during the first communication session by at least the first terminal, said first drawing data being intended to be transmitted to the second terminal. The communication method comprises, if the second terminal is not available to participate in the first communication session, a step of recording said first drawing data in a communication device,
  after the end of said first communication session, a step of detecting an available state of the second terminal for participation in a communication session, triggering the sending of an invitation message by the communication device to the second terminal to participate in a second communication session,
  a step in which the communication device receives an acceptance message for participation in said second communication session, sent from the second terminal, allowing the second communication session to be established between the second terminal and the communication device,
  during the second communication session, a step of sending said first recorded drawing data to the second terminal.

Thus the invention enables a terminal which is invited to participate in a first communication session, and which is not available to participate in the first communication session (in this case, the second terminal) to receive, during a new communication session, the drawing data generated during the first communication session.

As a result of the invention, the drawing data generated during the first communication session are transmitted to a terminal of this type as soon as the terminal becomes available again to participate in a drawing communication session.

For example, a terminal may not have been available to participate in the first communication session because the terminal was switched off or not connected to a communications network, or because the communications network did not allow the establishment of the communication session, or because the user of the terminal ignored the invitation to participate in the communication session.

Advantageously, the invention enables terminals to communicate in a drawing communication mode during a plurality of communication sessions by switching from synchronous to asynchronous mode according to the availability of the terminals invited to participate in the communication session. The term "synchronous mode" here denotes a communication mode in which the drawing data generated by the terminals participating in the communication session are exchanged between the terminals participating in the communication session in real time, during the communication session. The term "asynchronous mode" here denotes a communication mode in which the drawing data generated during a communication session are exchanged after the end of the communication session between the terminals invited to participate in the communication session.

According to the invention, the first terminal establishes a communication session in synchronous mode. Since the second terminal is not available for the first communication session, the first drawing data are then generated by the first terminal in an asynchronous communication mode with respect to the second terminal.

In a first variant, the invention is advantageously used by the first terminal. The first terminal is then the communication device.

In this first variant, the establishment of a second communication session for sending the drawing data advantageously enables continuity to be provided in the drawing communication between the users of the terminals invited to the first communication session, while optimizing the resources of the communications network and not keeping a first communication session open when the terminals are no longer communicating.

The establishment of the second communication session for transmitting the first drawing data to the second terminal is transparent to the first terminal. The user of the first terminal does not need to interact with his terminal in order to send the first drawing data to the second terminal at the end of the first communication session.

In a second variant, the invention is used by a storage server of a communications network. Advantageously, this second variant allows a simpler use of the invention when the first communication session comprises at least one terminal, in addition to the first terminal, which also generates first drawing data. This is because, when more than one terminal participates in the first communication session, this second variant enables the first drawing data generated in the first communication session to be sent to the second terminal during the same second communication session. Moreover, this second variant optimizes the use of the resources of the terminals that have participated in the first communication session.

The different forms or characteristics of embodiment mentioned below may be added, independently or in combination with one another, to the characteristics of the communication method defined above.

According to a particular embodiment of the invention, the communication method comprises, during a communication session, a step of accepting from the second terminal second drawing data generated by the second terminal, in response to the second terminal's acceptance of said first drawing data that have been sent, said second drawing data being intended to be added to the first drawing data in order to be retrieved by the first terminal during the communication session if the first terminal is available to participate in the communication session, or, if this is not the case, during a subsequent communication session.

Thus this particular embodiment of the invention enables a terminal which was not available to participate in a first drawing communication session to modify, during a new communication session, the drawing data generated during the first communication session.

According to this particular embodiment of the invention, the first terminal has generated the first drawing data during the first communication session in asynchronous mode with respect to the second terminal. During a new communication session, the second drawing data generated by the second terminal are exchanged with the first terminal in synchronous mode if the first terminal is available to participate in the new communication session, or in asynchronous mode if the first terminal is not available to participate in the new communication session.

The invention also concerns a method for receiving first drawing data generated during a first communication session which was established on the initiative of a first terminal by the first terminal's sending of an invitation message to the second terminal to participate in said first communication session. During the first communication session, the first drawing data are generated by at least the first terminal. The reception method comprises, if the second terminal is not available to participate in the first communication session, after the end of said first communication session,
- a step of modifying the state of the second terminal to an available state to participate in a communication session,
- a step in which the second terminal receives an invitation message to participate in a second communication session, sent from a communication device,
- a step in which the second terminal sends to the communication device an acceptance message for participation in said second communication session, allowing said second communication session to be established between the second terminal and the communication device,
- during the second communication session, a step in which the second terminal receives said first drawing data, said first drawing data having previously been recorded by the communication device during the first communication session.

According to the invention, the second terminal, which has not participated in the first communication session, may subsequently receive the drawing data exchanged during the first communication session, without any need for interaction by the second terminal.

The reception of the first drawing data also allows the second terminal to be informed that a first communication session has taken place, during which first drawing data were generated. The second terminal does not need to send a request to the communication device to receive the first drawing data.

According to the invention, the establishment of a second session for sending the first drawing data to the second terminal allows the second terminal to manipulate the first drawing data during a new communication session, without any need for the user of the second terminal to interact with his terminal. Once the first drawing data have been received, the user of the second terminal is free to participate in a new communication session, or to close the communication application that was used to establish the second communication session on his terminal.

The different forms or characteristics of embodiment mentioned below may be added, independently or in combination with one another, to the characteristics of the reception method defined above.

According to a particular embodiment of the invention, the first drawing data are added in the second terminal to a conversation thread between at least the user of the first terminal and the user of the second terminal, said conversation thread comprising a history of the communication data exchanged between at least the first terminal and the second terminal during preceding communication sessions.

According to this particular embodiment of the invention, the drawing data generated during the first communication session are integrated with the communication data exchanged between the first terminal and the second terminal during preceding communication sessions. These communication data are, for example, SMS or MMS messages or drawings exchanged between the user of the first terminal and the user of the second terminal. The first drawing data generated by the first terminal are thus regrouped for the user of the second terminal in the same space as that of the history of communications established with the user of the first terminal. The drawing data are retrieved as conventional communication data. The user of the second terminal can thus easily interact with the drawing data in the same way as he would respond to a received text message.

According to another particular embodiment of the invention, the method for receiving first drawing data comprises:
- a step in which the second terminal generates second drawing data, in response to the retrieval of said first received drawing data on the second terminal,
- a step in which the second terminal sends said second drawing data to the communication device, said second drawing data being intended for at least the first terminal.

According to this particular embodiment of the invention, the second terminal interacts on the basis of the first drawing data received in order to modify or complete the drawing resulting from the first communication session. The second terminal can thus provide the contribution of the user of the second terminal to the drawing data generated in the first communication session, even if the second terminal was not available during the first communication session.

According to another particular embodiment of the invention, if the communication device is a storage server of a communications network, the generation of said second drawing data by the second terminal causes a message of invitation to a third communication session to be sent to the first terminal.

If the second terminal interacts with the drawing resulting from the first communication session initiated by the first terminal, this particular embodiment of the invention enables a third communication session to be established with the first terminal even when the storage server is used for sending the first drawing data to the second terminal. Thus the first terminal and the second terminal can communicate about the drawing in synchronous mode during the third communication session.

The invention also relates to a device for communicating between at least a first terminal and a second terminal, a first communication session having previously been established on the initiative of the first terminal by the first terminal's sending of an invitation message to the second terminal to participate in said first communication session. During the first communication session, first drawing data are generated by at least the first terminal, said first drawing data being intended for transmission to the second terminal. The communication device comprises the following means, which are activated if the second terminal is not available to participate in the first communication session:

means for recording said first drawing data,
means for detecting an available state of the second terminal for participation in a communication session, triggering means for sending an invitation message to the second terminal to participate in a second communication session, said detection means being activated after the end of said first communication session,
means for receiving an acceptance message for participation in said second communication session, sent from the second terminal, allowing the second communication session to be established between the second terminal and said communication device,
means for sending said first recorded drawing data to the second terminal, the sending means being activated during the second communication session.

The invention also concerns a device for receiving first drawing data generated during a first communication session established on the initiative of a first terminal, by the first terminal's sending of an invitation message to the second terminal to participate in said first communication session. During the first communication session, the first drawing data are generated by at least the first terminal. The receiving device comprises the following means, which are activated if the second terminal is not available to participate in the first communication session, after the end of said first communication session:

means for modifying the state of the second terminal to an available state for participation in a communication session,
means for receiving an invitation message to participate in a second communication session, sent from a communication device,
means for sending to the communication device an acceptance message for participation in said second communication session, allowing said second communication session to be established between said receiving device and the communication device,
means for receiving said first drawing data, said first drawing data having previously been recorded by the communication device during the first communication session, said receiving means being activated during the second communication session.

The invention also relates to a terminal comprising a communication device or a device for receiving first drawing data according to any of the particular embodiments cited above.

In a particular embodiment, the various steps of the communication method and the steps of the method for receiving first drawing data are executed by instructions in computer programs. Consequently, the invention also proposes computer programs on a data medium, these programs being suitable for running, respectively, on a terminal, or more generally on a computer, these programs comprising, respectively, instructions adapted for the execution of the various steps of the communication method or the method for receiving first drawing data described above.

These programs can use any programming language, and can be in the form of source code, object code, or a code intermediate between source and object code, such as a code in partially compiled form, or any other desirable form.

The invention also proposes a computer-readable data medium comprising instructions of a computer program as mentioned above.

The data medium can be any entity or device capable of storing the program. For example, the medium can comprise a storage means such as a ROM, for example a CD-ROM or a microelectronic circuit ROM, or a magnetic or electronic recording means such as a USB memory stick or a hard disk.

On the other hand, the data medium can be a transmissible medium such as an electrical or optical signal which can be routed via an electrical or optical cable, by radio or by other means. The program according to the invention can, in particular, be downloaded from a network such as the Internet.

Alternatively, the data medium can be an integrated circuit in which the program is incorporated, the circuit being adapted to execute the communication method or the method for receiving first drawing data in question, or to be used in its execution.

The advantages of the communication device, the device for receiving first drawing data, the terminal, and the computer program are identical to those described in connection with the communication method and with the method for receiving first drawing data according to any of the particular embodiments mentioned above.

LIST OF FIGURES

Figure 4:
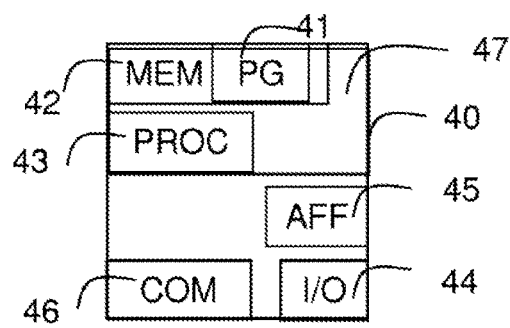
Figure 5:
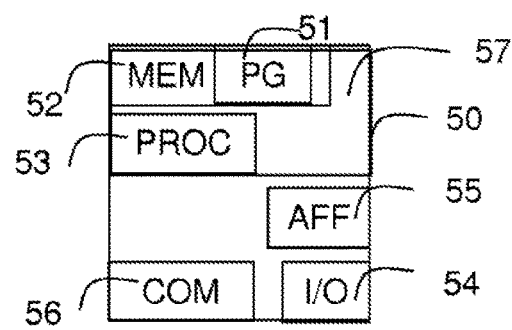
Figure 2:
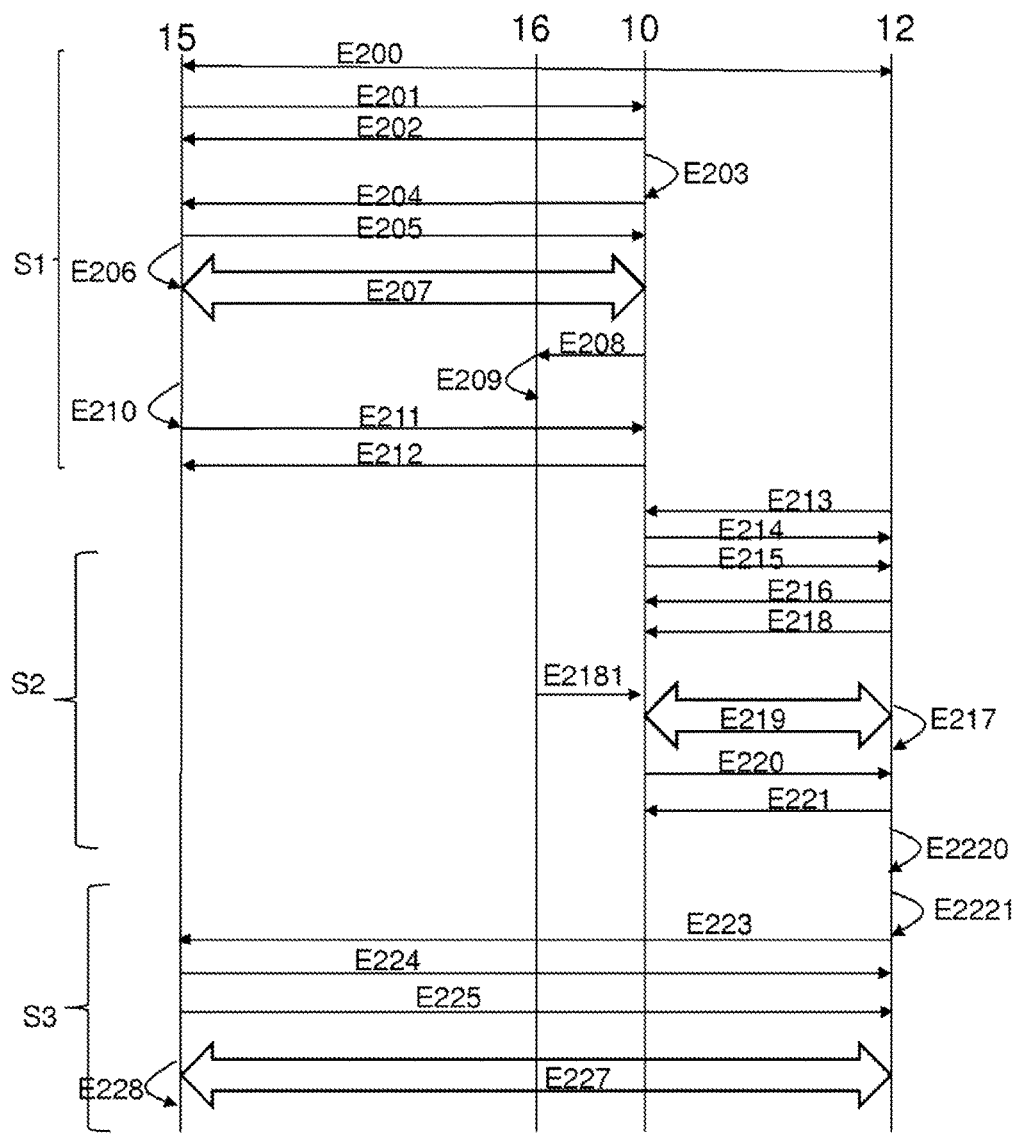
Figure 3:
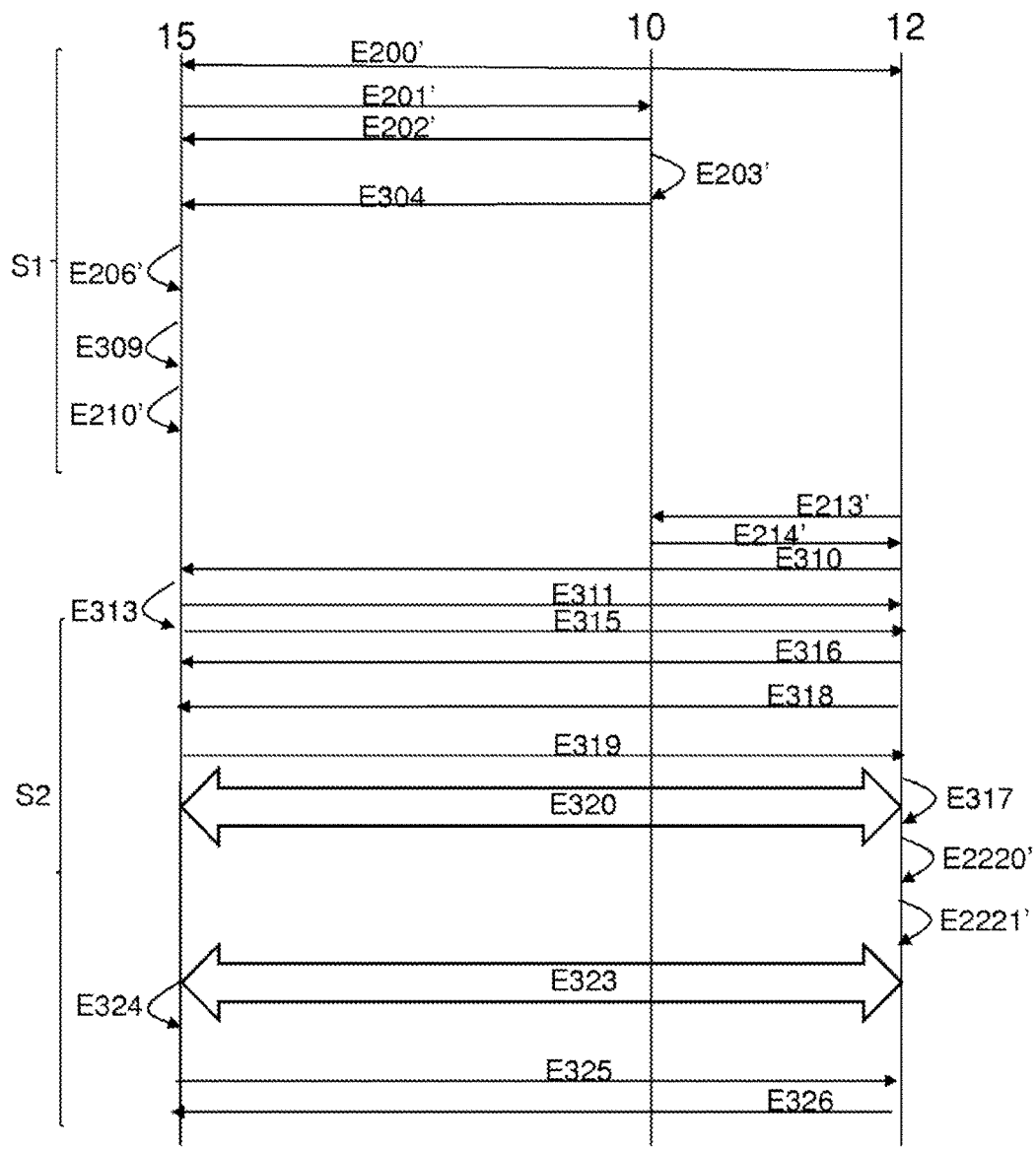

Other advantages and characteristics of the invention will be more fully evident from the following description of a particular embodiment of the invention, provided as a simple illustrative and non-limiting example, and from the appended drawings, of which:

FIG. 1 shows an environment for the use of the invention according to a particular embodiment of the invention, FIG. 2 shows steps of the communication method and steps of the method for receiving first drawing data according to a particular embodiment of the invention, FIG. 3 shows steps of the communication method and steps of the method for receiving first drawing data according to another particular embodiment of the invention, FIG. 4 shows a communication device using the communication method according to a particular embodiment of the invention, and FIG. 5 shows a device for receiving first drawing data using the method for receiving first drawing data according to a particular embodiment of the invention.

DESCRIPTION OF A PARTICULAR EMBODIMENT OF THE INVENTION

FIG. 1 shows an environment for the use of the invention according to a particular embodiment of the invention.

The environment shown in FIG. 1 comprises a communications network 10 to which the terminals 12 and 15 and a storage server 16 are connected.

For example, the communications network 10 is a mobile communications network of the GSM, EDGE, 3G, 3G+, 4G or other type. It can be implemented in an RCS architecture.

The communications network 10 may be a group of communications networks of different operators interconnected with one another via interconnection servers (not shown).

The terminals 12 and 15 can be any type of terminal that can establish communication sessions of the telephone, videophone, instant messaging, whiteboard or other types. The terminals 12 and 15 may be, for example, mobile telephones, smartphones (the English term for an intelligent telephone), tablets, televisions connected to a telecommunications network, or personal computers. In the example described here, the terminal 15 is a terminal associated with a user UA and the terminal 12 is a terminal associated with a user UB. The terminals 12 and 15 are connected to the communications network 10 and can transmit and receive all types of communications via the communications network 10.

Notably, the terminals 12 and 15 can establish a drawing communication session via the communications network 10.

According to the invention, if the terminal 15 wishes to establish a first drawing communication session with the terminal 12 but the terminal 12 is not available to establish this session, then, according to a first variant, the communication method is executed by the communications network 10 in association with the storage server 16. According to a second variant, the communication method is executed by the terminal 15. The communication method enables the user UA of the terminal 15 to draw on his terminal 15 during the first communication session and, after the end of the first communication session, to transmit the drawing data generated by the terminal 15 during the first communication session to the terminal 12. These data are transmitted, during a second communication session, to the terminal 12 if the terminal 12 is again in an available state for establishing a communication session.

The available state of the terminal 12 is considered to be the state as seen from the viewpoint of the communications network 10. From the viewpoint of the communications network 10, the terminal 12 is not available to establish a communication session because, for example, it is not registered in the core of the communications network 10, or because the terminal 12 has sent to the communications network 10 a presence indicator showing that it does not wish to receive a communication or a certain type of communication, or because the communications network to which the terminal 12 is connected does not allow the establishment of the type of communication session requested by the terminal 15.

According to the invention, the receiving method is used by the terminal 12 to enable the terminal 12 to obtain the drawing data generated by the terminal 15 during the first communication session and, if appropriate, to interact with these drawing data during a new communication session.

FIG. 2 shows steps of the communication method and steps of the method for receiving first drawing data according to a particular embodiment of the invention. In this particular embodiment of the invention, the communication method is executed by the communications network 10 in association with the storage server 16.

In a preliminary step E200, the terminals 12 and 15 exchange their respective capabilities in order to discover the functionality and RCS services that each terminal can support. This exchange of capabilities can be carried out, for example, by exchanging OPTIONS messages between the terminals 12 and 15 according to the SIP ("Session Initiation Protocol"). Notably, the terminals 12 and 15 indicate in the OPTIONS message sent to the other terminal whether or not they support the drawing capability. The drawing capability can be defined in the OPTIONS message according to the RCS standard, or according to an operator's proprietary functionality. Step E200 is regularly executed by each terminal 12 and 15 in order to refresh the information on the capabilities of the terminals with which the terminals 12 and 15 usually communicate, which are stored in the terminals 12 and 15. For example, step E200 is executed on each start-up of the terminal 12 or 15, or once per day at a predetermined time.

After step E200, the terminal 15 stores a data element in association with an identifier of the terminal 12, indicating that the terminal 12 supports the synchronous-asynchronous drawing capability according to the communication method and the receiving method as defined by the invention.

Similarly, the terminal 12 stores a data element in association with an identifier of the terminal 15, indicating that the terminal 15 supports the synchronous-asynchronous drawing capability according to the invention.

If user UA wishes to establish a drawing communication session with user UB, he activates on his terminal 15 a communication application of the drawing type, initiates a new drawing based on this application, and selects user UB from the contacts recorded on his terminal 15.

In a step E201, the terminal 15 then sends an INVITE message according to the SIP protocol to the terminal 12, in order to establish a communication session S1 between the terminal 15 and the terminal 12. The INVITE message contains, notably, in a field "svg id", an identifier of the drawing which is the subject of the communication session initiated by the terminal 15. The INVITE message sent by the terminal 15 is an invitation message to participate in the communication session.

In step E201, the INVITE message is received by the communications network 10. In a step E202, the communications network 10 then sends a 183 Progress message according to the SIP protocol to the terminal 15, indicating to the terminal 15 that the communications network is extending its invitation message to the terminal 12.

In a step E203, the communications network detects that the terminal 12 is not available to establish a communication session. For example, the terminal 12 is not registered in the core of the communications network 10 and the communications network 10 then cannot send the invitation message to the terminal 12.

According to another particular embodiment of the invention, the terminal 12 is involved in another communication in progress and has replied with a 4xx Busy message to the communications network 10.

Since the terminal 12 is not available to establish a communication session with the terminal 15, the communications network 10 accepts in place of this the invitation message sent by the terminal 15. For this purpose, in a step E204, the communications network 10 sends a 200 OK message according to the SIP protocol to the terminal 15.

In a step E205, the terminal 15 sends an ACK message to the communications network 10, closing the phase of establishing the communication session S1.

After step E205, the communication session S1 is established between the terminal 15 and the communications network 10.

In a step E206, user UA draws on the interface of his terminal 15. In step E206, the terminal 15 then generates drawing data corresponding to the movements of user UA on the interface of the terminal 15.

In a step E207, the drawing data generated in step E206 are sent by the terminal 15 to the communications network 10 according to the MSRP ("Message Session Relay Protocol") protocol defined in the RFC 4975 standard of the IETF ("Internet Engineering Task Force"). The MSRP protocol is particularly advantageous for the transmission of successive instant message data.

In step E207, the communications network receives the drawing data sent by the terminal 15.

In a step E208, the communications network 10 transmits the drawing data received from the terminal 15 to the storage server 16. In step E208, the communications network 10 sets an indicator associated with the terminal 12, indicating that drawing data recorded in the storage server 16 are intended for the terminal 12.

In a step E209, the storage server 16 records the drawing data received in step E208. The drawing data are recorded by the storage server 16 in a vector graphics format, for example according to the SVG ("Scalable Vector Graphics") file format known to those skilled in the art. Thus this format can facilitate the retrieval of the drawing represented by the recorded drawing data, while allowing other new drawing data to be added to the recorded drawing data. Moreover, the SVG format enables each drawing data element to be recorded independently. Thus the development of the drawing can be replayed, by progressively displaying on a terminal screen each drawing data element in the chronological order in which the elements were generated.

In step E209, the storage server records the drawing data in association with identification data of the communication session S1. These identification data comprise, notably, the identifier of the drawing contained in the "svg id" field of the SIP INVITE message sent by the terminals 15 in step E201, information for identifying the terminals invited to participate in the communication session S1, and information for identifying the terminals that were not available to participate in the communication session S1 among the terminals invited to participate in the communication session S1.

The recorded identification data of the communication session S1 can be used subsequently when requesting the establishment of a new communication session between the terminals that were initially invited to participate in the communication session S1, based on the drawing data generated in the communication session S1.

In a step E210, user UA exits the drawing communication application.

In a step E211, the terminal 15 sends a BYE message to the communications network 10, indicating that the terminal 15 wishes to terminate the current communication session S1.

In a step E212, the communications network 10 then sends a SIP 200 OK message to acknowledge the end of the communication session S1.

After step E212, the communication session S1 is terminated.

In a step E213, the terminal 12 modifies its state to an available state for establishing a communication session.

For example, if the terminal 12 was not registered in the core of the communications network 10, the terminal 12 sends a registration message to the communications network 10 in step E213. The registration message is sent in the form of a REGISTER message according to the SIP protocol, and enables the core of the communications network 10 to register the terminal 12.

The reception by the communications network 10 of the registration message sent by the terminal 12 enables the communications network 10 to detect, in step E213, the modification of the state of the terminal 12 to an available state for establishing a communication session.

In a step E214, the communications network 10 sends a 200 OK message to the terminal 12 to acknowledge the registration of the terminal 12 in the core of the communications network 10.

The detection by the communications network 10 of the modification of the state of the terminal 12 to an available state for participating in a communication session causes the communications network 10 to sent an invitation message to the terminal 12 to participate in a communication session S2, in a step E215. The invitation message is sent in the form of a SIP INVITE message, and comprises, notably, in an "svg id" field, the identifier of the drawing initiated during the communication session S1 and an identifier of the terminal 15, indicating to the terminal 12 that the communication session S1 was initiated by the terminal 15.

In a step E216, the terminal 12 sends a SIP 180 Ringing message indicating to the communications network that the terminal 12 is currently notifying user UB of the request to establish a communication session sent by the communications network 10.

Since the terminal 12 is in an available state to establish a communication session, the terminal 12 automatically accepts, in a step E218, the request to establish a communication session sent by the communications network 10. For this purpose, the terminal 12 sends to the communications network an acceptance message for participation in the requested communication session, in step E218, in the form of a SIP 200 OK message.

After step E218, a communication session S2 is established between the terminal 12 and the communications network 10.

In a step E2181, the communications network 10 obtains the drawing data generated in the communication session S1 from the storage server 16.

In a step E219, the communications network 10 sends the drawing data generated in the communication session S1 to the terminal 12. The drawing data are sent to the terminal 12 according to the MSRP protocol. In step E219, the terminal 12 receives the drawing data sent by the communications network 10.

The drawing data are sent to the terminal 12 in the state in which the terminal 15 had sent them during communication session S1. For example, the drawing data are sent in the same chronological order as that in which the terminal 15 had generated them. Thus user UB can see how the drawing made by user UA in the communication session S1 has been developed.

When all the drawing data generated during the communication session S1 have been sent to the terminal 12, in a step E220, the communications network 10 sends a SIP BYE message to the terminal 12 to close the communication session S2.

In a step E221, the terminal 12 acknowledges the end of the communication session S2 by sending a SIP 200 OK message to the communications network.

According to a particular embodiment of the invention, the terminal 12 has a memory comprising a history of the communication data exchanged between the terminal 12 and the terminal 15 during preceding communication sessions. This history is retrieved on the terminal 12 for the user UB in the form of a conversation thread including all types of communication sessions established previously between the terminal 12 and the terminal 15. For example, the conversation thread comprises SMS or MMS messages, electronic mail, the telephone call log, and the drawings created jointly during a communication session.

According to this particular embodiment of the invention, in a step E217, the terminal 12 adds the drawing data received from the communications network 10 during the communication session S2 to the conversation thread.

According to another particular embodiment of the invention, in a step E2220, the terminal 12 retrieves on a graphical interface the drawing data received from the communications network 10. In this particular embodiment of the invention, user UB completes the drawing represented by the drawing data displayed by the terminal 12, by drawing on the interface of his terminal 12. In a step E2221, the terminal 12 generates new drawing data in response to user UB's interaction with the interface of his terminal. The drawing data received in step E219 are recorded by the terminal 12 in a vector format. Thus the drawing data retrieved on the terminal 12 are easily modifiable.

The generation of new drawing data, based on the drawing data generated during the communication session S1 and retrieved on the interface of the terminal 12, causes the establishment of a new communication session S3 between the terminal 12 and the terminal 15. For this purpose, in a step E223, the terminal 12 sends an invitation message to the terminal 15 to participate in the new communication session S3. The invitation message is sent in the form of a SIP INVITE message, and comprises, notably, in the "svg id" field, the identifier of the drawing initiated during the communication session S1.

In a step E224, the terminal 15 sends a SIP 180 Ringing message in response to the terminal 12. In a step E225, since the terminal 15 is available to establish a communication session, the terminal 15 sends an acceptance message for participation in the communication session S3 to the terminal 12, in the form of a SIP 200 OK message.

When the terminal 12 has received the 200 OK message sent by the terminal 15 during step E225, the communication session S3 is established between the terminal 15 and the terminal 12. In a step E227, the drawing data generated by the terminal 12 during step E2221 are sent to the terminal 15 according to the MSRP protocol. In step E227, the terminal 15 receives the drawing data generated by the terminal 12 during step E2221.

In a step E228, the drawing data received by the terminal 15 during step E227 are added to the drawing data generated by the terminal 15 during the communication session S1. In step E228, the drawing data generated by the terminal 15 during the communication session S1 and the drawing data received by the terminal 15 in step E227 are retrieved by the terminal 15 on the screen of the terminal.

The terminals 12 and 15 then communicate in a conventional manner during the communication session S3, by exchanging the drawing data generated by each terminal as a result of a user's interaction with the interface of the terminal.

According to another particular embodiment of the invention, in step E223, if the terminal 15 is not available to establish a communication session S3, the communications network 10, in association with the storage server 16, execute the communication method as described according to steps E202 to E219, while replacing the terminal 12 with the terminal 15 in the description of these steps. In this particular embodiment of the invention, the terminal 12 is then in an asynchronous communication session.

FIG. 3 shows steps of the communication method and steps of the receiving method according to another particular embodiment of the invention. In this particular embodiment of the invention, the communication method is executed by the terminal 15.

In this particular embodiment of the invention, in a preliminary step E200', the terminals 12 and 15 exchange their capabilities in a similar way to that described for step E200 in relation to FIG. 2. The user of the terminal 15 wishes to draw jointly with the user of the terminal 12 during a communication session S1 initiated by the terminal 15. In a step E201', the terminal 15 sends an invitation message to the terminal 12 to participate in the communication session S1. The invitation message is sent in the form of a SIP INVITE message in a similar way to that of step E201 described in relation to FIG. 2.

In step E201', the INVITE message is received by the communications network 10. In a step E202', the communications network 10 then sends a 183 Progress message according to the SIP protocol to the terminal 15, indicating to the terminal 15 that the communications network is extending its invitation message to the terminal 12.

In a step E203', the communications network detects that the terminal 12 is not available to establish a communication session, in a similar way to that of step E203 described in relation to FIG. 2.

In a step E304, since the terminal 12 is not available to establish a communication session with the terminal 15, the communications network 10 sends a SIP 4xxx "Client Failure Response" message indicating to the terminal 15 that the terminal 12 is not available to establish a communication session.

In this particular embodiment of the invention, the terminal 15 is then the only participant in the communication session S1.

According to another particular embodiment of the invention, if the terminal 15 has invited terminals other than the terminal 12 to participate in the communication session S1 and at least one other terminal has accepted the communication session S1, the communication session S1 is established between the terminal 15 and said at least one other terminal.

In a step E206', user UA draws on the interface of his terminal 15. In step E206', the terminal 15 then generates drawing data corresponding to the movements of user UA on the interface of the terminal 15.

In a step E309, the terminal 15 records the drawing data generated in step E206'. The drawing data are recorded by the terminal 15 in a vector graphics format, for example according to the SVG ("Scalable Vector Graphics") file format known to those skilled in the art.

In step E309, the terminal 15 records the drawing data in association with identification data of the communication session S1. These identification data comprise, notably, the identifier of the drawing contained in the "svg id" field of the SIP INVITE message sent by the terminal 15 in step E201', information for identifying the terminals invited to participate in the communication session S1, and information for identifying the terminals that were not available to participate in the communication session S1 among the terminals invited to participate in the communication session S1.

The recorded identification data of the communication session S1 can be used subsequently when requesting the establishment of a new communication session between the terminals that were initially invited to participate in the communication session S1, based on the drawing data generated in the communication session S1.

In a step E210', user UA exits the drawing communication application used by the terminal 15 for drawing in a communication session.

After step E210', the communication session S1 is terminated.

In a step E213', the terminal 12 modifies its state to an available state for establishing a communication session.

For example, if the terminal 12 was not registered in the core of the communications network 10, the terminal 12 sends a registration message to the communications network 10 in step E213'. The registration message is sent in the form of a REGISTER message according to the SIP protocol, and enables the core of the communications network 10 to register the terminal 12.

In a step E214', the communications network 10 sends a 200 OK message to the terminal 12 to acknowledge the registration of the terminal 12 in the core of the communications network 10.

In a step E310, the terminal 12 sends a SIP OPTIONS message to the terminal 15 to interrogate the terminal 15 about its RCS capabilities. In step E310, the terminal 15 receives the SIP OPTIONS message sent by the terminal 12. In a step E311, the terminal 15 then responds to the terminal 12 by sending a SIP OPTIONS message containing the RCS capabilities of the terminal 15.

In a variant, in step E310, the terminal 12 sends a SIP MESSAGE message to the terminal 15, declaring its presence for receiving communication sessions from all its contacts and notably from the terminal 15. In this variant, in step E311, the terminal 15 responds to the terminal 12 by sending a 200 OK SIP message.

In another variant, in step E310, the terminal 12 declares its presence for receiving communication sessions from the communications network 10 by sending a SIP NOTIFY message to the communications network 10. In step E310, the communications network 10 extends the SIP NOTIFY message to all the terminals having subscribed to the event of the declaration of the presence of the terminal 12. For example, all the terminals belonging to a contact group of the terminal 12 and having the drawing capability according to the RCS protocol have subscribed to this event.

In step E310, the terminal 15 receives the NOTIFY SIP message sent from the communications network 10. In this other variant, in step E311, the terminal 15 responds to the terminal 12 by sending a SIP 200 OK message.

The reception by the terminal 15 of the SIP OPTIONS or SIP NOTIFY or SIP MESSAGE message sent by the terminal 12 in step E310 enables the terminal 15 to detect, in a step E313, the modification of the state of the terminal 12 to an available state for establishing a communication session.

The detection by the communications network 15 of the modification of the state of the terminal 12 to an available state for participating in a communication session causes the communications network 15 to send an invitation message to the terminal 12 to participate in a communication session S2, in a step E315. The invitation message is sent in the form of a SIP INVITE message, and comprises, notably, in an "svg id" field, the identifier of the drawing initiated during the communication session S1 and an identifier of the terminal 15, indicating to the terminal 12 that the communication session S1 was initiated by the terminal 15.

In a step E316, the terminal 12 sends a SIP 180 Ringing message to the terminal 15, indicating to the terminal 15 that the terminal 12 is currently notifying to user UB the request to establish a communication session S2 sent by the terminal 15.

Since the terminal 12 is in an available state to establish a communication session, the terminal 12 automatically accepts, in a step E318, the request to establish a communication session sent by the terminal 15. For this purpose, the terminal 12 sends to the terminal 15 an acceptance message for participation in the requested communication session S2, in step E318, in the form of a SIP 200 OK message. In step E318, the terminal 15 receives the SIP 200 OK message sent by the terminal 12.

In a step E319, the terminal 15 responds to the terminal 12 by sending a SIP ACK acknowledgement message.

After step E319, a communication session S2 is established between the terminal 12 and the terminal 15.

In a step E320, the terminal 15 sends the drawing data generated in the communication session S1, and recorded by the terminal 15, to the terminal 12. The drawing data are sent to the terminal 12 according to the MSRP protocol. In step E320, the terminal 12 receives the drawing data sent by the terminal 15, via the communications network 10.

The drawing data are sent to the terminal 12 in the state in which the terminal 15 had generated them during the communication session S1. For example, the drawing data are sent in the same chronological order as that in which the terminal 15 had generated them. Thus user UB can see how the drawing made by user UA in the communication session S1 has been developed.

According to a particular embodiment of the invention, in a step E317, the terminal 12 executes a step of adding drawing data received in step E320 to a conversation thread, this step being identical to the adding step E217 described in relation to FIG. 2.

According to another particular embodiment of the invention, in a step E2220', the terminal 12 retrieves on a graphical interface the drawing data received in step E320.

In this particular embodiment of the invention, user UB completes the drawing represented by the drawing data displayed by the terminal 12, by drawing on the interface of his terminal 12. In a step E2221', the terminal 12 generates new drawing data in response to user UB's interaction with the interface of his terminal.

In a step E323, the drawing data generated by the terminal 12 in step E2221' are sent to the terminal 15 according to the MSRP protocol. In step E323, the terminal 15 receives the drawing data generated by the terminal 12 in step E2221'.

In a step E324, the drawing data received by the terminal 15 in step E323 are added to the drawing data generated by the terminal 15 during the communication session S1 and recorded by the terminal 15 in step E309. In step E324, the drawing data generated by the terminal 15 during the communication session S1 and the drawing data received by the terminal 15 in step E323 are retrieved by the terminal 15 on the screen of the terminal.

The terminals 12 and 15 then communicate in a conventional manner during the communication session S2, by exchanging drawing data generated by each terminal as a result of a user's interaction with the interface of the terminal.

In a step E325, if no drawing data have been exchanged during a predetermined time interval, for example 3 minutes, the terminal 15 or the terminal 12 sends to the other terminal, namely the terminal 12 or the terminal 15, a SIP BYE message to close the communication session S2 established between the terminal 15 and the terminal 12. In a step E326, the terminal 12 or the terminal 15 acknowledges the end of the communication session S2 by sending a SIP ACK message to the terminal 15 or the terminal 12.

The communication method and the method for receiving first drawing data have been described according to a particular embodiment of the invention, in which one or two terminals are involved in the drawing communication sessions S1, S2 or S3.

The invention can easily be used in cases where the communication sessions involve more than two terminals. For example, the communication session S1 may be established between a plurality of terminals.

In the embodiment described in relation to FIG. 2, the first drawing data generated during the communication session S1 by each terminal involved in the communication session S1 are then saved by the storage server 16 in step E209 and are transmitted to the terminal 15 in step E219.

In the embodiment described in relation to FIG. 3, each terminal involved in the communication session S1 saves the drawing data that it has generated during the communication session S1. If the terminal 12 becomes available again, each terminal that has been involved in the communication session S1 executes the steps of the communication method described in relation to FIG. 3, in an identical manner to the terminal 15.

FIG. 4 shows a device for executing the communication method according to a particular embodiment of the invention.

The device 40 comprises a storage module 42, for example a memory (MEM), a processing unit 43, equipped with a microprocessor (PROC) for example, and controlled by the computer program (PG) 41, executing the communication method as described in relation to FIG. 2 or 3. On initialization, the code instructions of the computer program 41 are, for example, loaded into the memory (MEM) before being executed by the processor (PROC) of the processing unit 43. The processor of the processing unit 43 executes the steps of the communication method established between at least a first terminal and a second terminal, a first communication session having previously been established on the initiative of the first terminal by the first terminal's sending of an invitation message to the second terminal to participate in said first communication session. During the first communication session, first drawing data have been generated by at least the first terminal, said first drawing data being intended for transmission to the second terminal. According to the instructions of the computer program 41, if the second terminal is not available to participate in the first communication session, the processor of the processing unit 43 executes, notably,

- a step of recording said first drawing data in the memory (MEM),
- after the end of said first communication session, a step of detecting an available state of the second terminal for participation in a communication session, triggering the sending of an invitation message by the communication device to the second terminal to participate in a second communication session,
- a step in which the communication device receives an acceptance message for participation in said second communication session, sent from the second terminal, allowing the second communication session to be established between the second terminal and the communication device,
- and, during the second communication session, a step of sending said first recorded drawing data to the second terminal.

The storage module 42 can be used to store the first drawing data, generated during the first communication session, on the device 40.

The device 40 also comprises communication means 46. The communication means are, for example, implemented by a communication module (COM). The communication module, notably, enables the device 40 to establish communications via the communications network 10 of FIG. 1 with terminal 12 of FIG. 1. The communication module (COM) can be used to send an invitation message to participate in a communication session, to receive an acceptance message for participation in the communication session, and to send first recorded drawing data.

According to a particular embodiment of the invention, the device 40 also comprises a user interaction means 44 (I/O) enabling the user to interact with the device 40, for example in order to develop a drawing on an interface of the device 40. The user interaction means 44 are, for example, implemented by means of a user interface. This user interface may be a keyboard, a mouse, or a touch screen.

According to a particular embodiment of the invention, the device 40 comprises retrieval means 45 (I/O) which can be used, notably, to retrieve the drawing data generated by the device 40 following a user interaction on an interface of the device 40, or drawing data received, for example, from the terminal 12 of FIG. 1. The retrieval means are, for example, implemented by a display module (AFF) such as a screen.

According to a particular embodiment of the invention, the device 40 is included in a terminal, such as the terminal 15 of FIG. 1. More generally, the device 40 is included in a terminal such as, for example, a fixed or mobile personal computer, a mobile telephone, a tablet, a connected television, a smartphone, or the like.

According to a particular embodiment of the invention, the device 40 is included in a server, such as the storage server 16 of FIG. 1.

FIG. 5 shows a device for executing the method of receiving first drawing data according to a particular embodiment of the invention.

The device 50 comprises a storage module 52, for example a memory (MEM), a processing unit 53, equipped with a microprocessor (PROC) for example, and controlled by the computer program (PG) 51, executing the method for receiving first drawing data as described in relation to FIG. 2 or 3. On initialization, the code instructions of the computer program 51 are, for example, loaded into the memory (MEM) before being executed by the processor (PROC) of the processing unit 53. The processor of the processing unit 53 executes the steps of the method for receiving first drawing data generated during a first communication session established on the initiative of a first terminal, by the first terminal's sending of an invitation message to the device 50 to participate in said first communication session. During the first communication session, the first drawing data have been generated by at least the first terminal. According to the instructions of the computer program 41, if the device 50 is not available to participate in the first communication session, and after the end of said first communication session, the processor of the processing unit 53 executes:

- a step of modifying the state of the device 50 to an available state for participation in a communication session, a step of receiving an invitation message to participate in a second communication session, sent from a communication device, a step of sending to the communication device an acceptance message for participation in said second communication session, allowing said second communication session to be established between the device 50 and the communication device, and, during the second communication session, a step of receiving said first drawing data, said first drawing data having previously been recorded by the communication device during the first communication session.

The device 50 also comprises communication means 56. The communication means are, for example, implemented by a communication module (COM). The communication module (COM), notably, enables the device 50 to establish communications via the communications network 10 of FIG. 1 with terminal 15 of FIG. 1. The communication module (COM) can be used to receive an invitation message to participate in a communication session, to send an acceptance message for participation in the communication session, and to receive first recorded drawing data.

According to a particular embodiment of the invention, the communication module (COM) can be used to send an invitation message to participate in a new communication session.

The storage module 52 can be used to store the first drawing data received and identification data of a communication session.

According to a particular embodiment of the invention, the storage module 52 can be used to store on the device 50 a history of the communication data exchanged between at least the first terminal and the second terminal during preceding communication sessions.

According to a particular embodiment of the invention, the device 50 also comprises user interaction means 54 (I/O) enabling the user to interact with the device 50, for example in order to develop a drawing on an interface of the device 50. The user interaction means 54 are, for example, implemented by means of a user interface. This user interface may be a keyboard, a mouse, or a touch screen.

According to a particular embodiment of the invention, the device 50 comprises retrieval means 55 which can be used, notably, to retrieve the drawing data generated by the device 50 following a user interaction on an interface of the device 50, or the drawing data received from the terminal 15 or from the storage server 16 of FIG. 1. The retrieval means are, for example, implemented by a display module (AFF) such as a screen.

According to a particular embodiment of the invention, the device 50 is included in a terminal, such as the terminal 12 of FIG. 1. More generally, the device 50 is included in a terminal such as, for example, a fixed or mobile personal computer, a mobile telephone, a tablet, a connected television, a smartphone, or the like.

The invention claimed is:

1. A method for communicating between at least a first terminal (15) and a second terminal (12), a first communication session (S1) having previously been established on the initiative of the first terminal by the first terminal's sending (E201) of an invitation message to the second terminal to participate in said first communication session, during the first communication session, first drawing data having been generated (E206) by at least the first terminal, said first drawing data being intended for transmission to the second terminal, wherein the method comprises, if the second terminal is not available to participate in the first communication session, a step of recording (E209) said first drawing data in a communication device (16), after the end of said first communication session, a step of detecting (E213) an available state of the second terminal for participation in a communication session, triggering the sending (E215) of an invitation message by the communication device to the second terminal to participate in a second communication session, a step in which the communication device receives (E216) an acceptance message for participation in said second communication session, sent from the second terminal, allowing the second communication session (S2) to be established between the second terminal and the communication device, during the second communication session, a step of sending (E219) said first recorded drawing data to the second terminal.

2. The communication method as claimed in claim 1, comprising a preliminary step of exchanges of capability information between the first terminal and the second terminal, indicating whether the first terminal or the second terminal supports a drawing capability.

3. The communication method as claimed in claim 2, comprising, during a communication session, a step of receiving from the second terminal second drawing data generated by the second terminal, in response to the second terminal's reception of said first drawing data that have been sent, said second drawing data being intended to be added to the first drawing data in order to be retrieved on the first terminal during the communication session if the first terminal is available to participate in said communication session, or, if this is not the case, during a subsequent communication session.

4. The communication method as claimed in claim 1, comprising, during a communication session, a step of receiving from the second terminal second drawing data generated by the second terminal, in response to the second terminal's reception of said first drawing data that have been sent, said second drawing data being intended to be added to the first drawing data in order to be retrieved on the first terminal during the communication session if the first terminal is available to participate in said communication session, or, if this is not the case, during a subsequent communication session.

5. A method for receiving first drawing data generated during a first communication session established on the initiative of a first terminal, by the first terminal's sending of an invitation message to the second terminal to participate in said first communication session, the first drawing data having been generated by at least the first terminal during the first communication session, wherein the method comprises, if the second terminal is not available to participate in the first communication session, after the end of said first communication session, a step of modifying the state of the second terminal to an available state to participate in a communication session, a step in which the second terminal receives an invitation message to participate in a second communication session, sent from a communication device, a step in which the second terminal sends to the communication device an acceptance message for participation in said second communication session, allowing said second communication session to be established between the second terminal and the communication device, during the second communication session, a step in which the second terminal receives said first drawing data, said first drawing data having previously been recorded by the communication device during the first communication session.

6. The method for receiving drawing data as claimed in claim 5, wherein the first drawing data are added in the second terminal to a conversation thread between at least the user of the first terminal and the user of the second terminal, said conversation thread comprising a history of the communication data exchanged between at least the first terminal and the second terminal during preceding communication sessions.

7. The method for receiving drawing data as claimed in claim 6, comprising:
   a step in which the second terminal generates second drawing data, in response to the retrieval of said first received drawing data on the second terminal,
   a step in which the second terminal sends said second drawing data to the communication device, said second drawing data being intended for at least the first terminal.

8. The method for receiving drawing data as claimed in claim 5, comprising:
   a step in which the second terminal generates second drawing data, in response to the retrieval of said first received drawing data on the second terminal,
   a step in which the second terminal sends said second drawing data to the communication device, said second drawing data being intended for at least the first terminal.

9. The method for receiving drawing data as claimed in claim 8, wherein, if the communication device is a storage server of a communications network, the generation of said second drawing data by the second terminal causes a message of invitation to a third communication session to be sent to the first terminal.

10. A device for communicating between at least a first terminal and a second terminal,
    a first communication session having previously been established on the initiative of the first terminal by the first terminal's sending of an invitation message to the second terminal to participate in said first communication session,
    during the first communication session, first drawing data having been generated by at least the first terminal, said first drawing data being intended for transmission to the second terminal,
    wherein the device comprises the following means, which are activated if the second terminal is not available to participate in the first communication session:
    means for recording said first drawing data,
    means for detecting an available state of the second terminal for participation in a communication session, triggering means for sending an invitation message to the second terminal to participate in a second communication session, said detection means being activated after the end of said first communication session,
    means for receiving an acceptance message for participation in said second communication session, sent from the second terminal, allowing the second communication session to be established between the second terminal and said communication device,
    means for sending said first recorded drawing data to the second terminal, the sending means being activated during the second communication session.

11. A device for receiving first drawing data generated during a first communication session established on the initiative of a first terminal, by the first terminal's sending of an invitation message to the second terminal to participate in said first communication session, the first drawing data having been generated by at least the first terminal during the first communication session, wherein the device comprises the following means, if the second terminal is not available to participate in the first communication session, and after the end of said first communication session:
    means for modifying the state of the second terminal to an available state for participation in a communication session,
    means for receiving an invitation message to participate in a second communication session, sent from a communication device,
    means for sending to the communication device an acceptance message for participation in said second communication session, allowing said second communication session to be established between said receiving device and the communication device,
    means for receiving said first drawing data, said first drawing data having previously been recorded by the communication device during the first communication session, said receiving means being activated during the second communication session.

12. A terminal comprising a device for communicating between at least a first terminal and a second terminal,
    a first communication session having previously been established on the initiative of the first terminal by the first terminal's sending of an invitation message to the second terminal to participate in said first communication session,
    during the first communication session, first drawing data having been generated by at least the first terminal, said first drawing data being intended for transmission to the second terminal,
    wherein the device comprises the following means, which are activated if the second terminal is not available to participate in the first communication session:
    means for recording said first drawing data,
    means for detecting an available state of the second terminal for participation in a communication session, triggering means for sending an invitation message to the second terminal to participate in a second communication session, said detection means being activated after the end of said first communication session,
    means for receiving an acceptance message for participation in said second communication session, sent from the second terminal, allowing the second communication session to be established between the second terminal and said communication device,
    means for sending said first recorded drawing data to the second terminal, the sending means being activated during the second communication session.

13. A terminal comprising a device for receiving first drawing data generated during a first communication session established on the initiative of a first terminal, by the first terminal's sending of an invitation message to the second terminal to participate in said first communication session, the first drawing data having been generated by at least the first terminal during the first communication session, wherein the device comprises the following means, if the second terminal is not available to participate in the first communication session, and after the end of said first communication session:

means for modifying the state of the second terminal to an available state for participation in a communication session, means for receiving an invitation message to participate in a second communication session, sent from a communication device, means for sending to the communication device an acceptance message for participation in said second communication session, allowing said second communication session to be established between said receiving device and the communication device, means for receiving said first drawing data, said first drawing data having previously been recorded by the communication device during the first communication session, said receiving means being activated during the second communication session.

14. A non-transitory computer-readable storage medium that can be read by a device for communicating and on which is stored a computer program comprising program code instructions for executing steps of a communication method, when the program is run by a processor, the method for communicating between at least a first terminal (15) and a second terminal (12), a first communication session (S1) having previously been established on the initiative of the first terminal by the first terminal's sending (E201) of an invitation message to the second terminal to participate in said first communication session, during the first communication session, first drawing data having been generated (E206) by at least the first terminal, said first drawing data being intended for transmission to the second terminal, wherein the method comprises, if the second terminal is not available to participate in the first communication session, a step of recording (E209) said first drawing data in a communication device (16), after the end of said first communication session, a step of detecting (E213) an available state of the second terminal for participation in a communication session, triggering the sending (E215) of an invitation message by the communication device to the second terminal to participate in a second communication session, a step in which the communication device receives (E216) an acceptance message for participation in said second communication session, sent from the second terminal, allowing the second communication session (S2) to be established between the second terminal and the communication device, during the second communication session, a step of sending (E219) said first recorded drawing data to the second terminal.

15. A non-transitory computer-readable storage medium that can be read by a device for communicating and on which is stored a computer program comprising program code instructions for executing steps of a receiving method, when the program is run by a processor, the method for receiving first drawing data generated during a first communication session established on the initiative of a first terminal, by the first terminal's sending of an invitation message to the second terminal to participate in said first communication session, the first drawing data having been generated by at least the first terminal during the first communication session, wherein the method comprises, if the second terminal is not available to participate in the first communication session, after the end of said first communication session, a step of modifying the state of the second terminal to an available state to participate in a communication session, a step in which the second terminal receives an invitation message to participate in a second communication session, sent from a communication device, a step in which the second terminal sends to the communication device an acceptance message for participation in said second communication session, allowing said second communication session to be established between the second terminal and the communication device, during the second communication session, a step in which the second terminal receives said first drawing data, said first drawing data having previously been recorded by the communication device during the first communication session.

* * * * *